United States Patent
Yang et al.

(10) Patent No.: US 11,059,031 B2
(45) Date of Patent: Jul. 13, 2021

(54) THREE-DIMENSIONAL LIGNIN POROUS CARBON/ZINC OXIDE COMPOSITE MATERIAL AND ITS PREPARATION AND APPLICATION IN THE FIELD OF PHOTOCATALYSIS

(71) Applicant: South China University of Technology, Guangzhou (CN)

(72) Inventors: Dongjie Yang, Guangzhou (CN); Yong Qian, Guangzhou (CN); Xueqing Qiu, Guangzhou (CN); Hongming Lou, Guangzhou (CN); Weifeng Liu, Guangzhou (CN); Xinping Ouyang, Guangzhou (CN); Zhiqiang Fang, Guangzhou (CN); Yuxia Pang, Guangzhou (CN); Conghua Yi, Guangzhou (CN)

(73) Assignee: South China University of Technology

( * ) Notice: Subject to any disclaimer, the term of this patent is extended or adjusted under 35 U.S.C. 154(b) by 225 days.

(21) Appl. No.: 16/318,916

(22) PCT Filed: Nov. 16, 2017

(86) PCT No.: PCT/CN2017/111338
§ 371 (c)(1),
(2) Date: Jan. 18, 2019

(87) PCT Pub. No.: WO2018/205539
PCT Pub. Date: Nov. 15, 2018

(65) Prior Publication Data
US 2019/0291081 A1    Sep. 26, 2019

(30) Foreign Application Priority Data
May 11, 2017 (CN) .......................... 201710328651.7

(51) Int. Cl.
*B01J 23/06* (2006.01)
*B01J 31/06* (2006.01)
(Continued)

(52) U.S. Cl.
CPC ............... *B01J 23/06* (2013.01); *B01J 31/06* (2013.01); *B01J 35/004* (2013.01); *B01J 35/10* (2013.01);
(Continued)

(58) Field of Classification Search
CPC . B01J 21/18; B01J 23/06; B01J 35/004; B01J 35/10; B01J 37/0036; B01J 37/009;
(Continued)

(56) References Cited

U.S. PATENT DOCUMENTS

| 9,352,297 B2* | 5/2016 | Alhooshani | B01J 20/3078 |
| 2010/0035775 A1* | 2/2010 | Viswanathan | C22C 1/1026 |
| | | | 508/123 |
| 2016/0083410 A1* | 3/2016 | Park | C01G 49/04 |
| | | | 502/185 |

FOREIGN PATENT DOCUMENTS

| CN | 103183372 A | | 7/2013 | |
| CN | 10 5289578 | * | 2/2016 | ............ B01J 23/26 |

(Continued)

OTHER PUBLICATIONS

Emile Haye et al., "ZnO/Carbon xerogel photocatalysts by low-pressure plasma treatment, the role of the carbon substrate and its plasma functionalization." Journal of Colloid and Interface Science 570, pp. 312-321. (Year: 2020).*

(Continued)

*Primary Examiner* — Patricia L. Hailey
(74) *Attorney, Agent, or Firm* — The Webb Law Firm (57) ABSTRACT

A three-dimensional lignin porous carbon/zinc oxide composite material and its preparation and application in the
(Continued)

field of photocatalysis are disclosed. The method includes preparing a lignin/zinc oxide precursor composite by a hydrothermal method from a zinc salt, a weak alkali salt and an industrial lignin, and preparing a three-dimensional lignin porous carbon/zinc oxide composite material by high temperature calcination of the lignin/zinc oxide precursor composite. The composite material has a regular three-dimensional pore structure, with zinc oxide nanoparticles uniformly embedded among the three-dimensional lignin porous carbon nanosheets. Application of the composite material to the field of photocatalysis, especially as a photocatalyst for photocatalytic degradation of organic dye pollutants, can significantly improve the degradation efficiency and rate, and has potential application value in the field of photocatalytic degradation of organic pollutants.

11 Claims, 5 Drawing Sheets

(51) Int. Cl.
| | | |
|---|---|---|
| B01J 35/00 | (2006.01) | |
| B01J 35/10 | (2006.01) | |
| B01J 37/00 | (2006.01) | |
| B01J 37/08 | (2006.01) | |
| B01J 37/36 | (2006.01) | |
| C02F 1/30 | (2006.01) | |
| B01J 37/10 | (2006.01) | |
| C08L 97/00 | (2006.01) | |
| C02F 101/34 | (2006.01) | |
| C02F 101/38 | (2006.01) | |
| C02F 101/30 | (2006.01) | |

(52) U.S. Cl.
CPC ......... *B01J 37/009* (2013.01); *B01J 37/0036* (2013.01); *B01J 37/084* (2013.01); *B01J 37/088* (2013.01); *B01J 37/10* (2013.01); *B01J 37/36* (2013.01); *C02F 1/30* (2013.01); *C02F 2101/308* (2013.01); *C02F 2101/34* (2013.01); *C02F 2101/38* (2013.01); *C02F 2305/10* (2013.01); *C08L 97/005* (2013.01); *Y02W 10/37* (2015.05)

(58) Field of Classification Search
CPC ........ B01J 37/084; B01J 37/088; B01J 37/10; B01J 37/36; C08L 97/005; Y02W 10/37; C02F 1/30; C02F 2101/308; C02F 2101/34; C02F 2101/38; C02F 2305/10
USPC .................................................. 502/180, 183
See application file for complete search history.

(56) References Cited

FOREIGN PATENT DOCUMENTS

| CN | 10 5544018 | * | 5/2016 | ............... D01D 1/02 |
|---|---|---|---|---|
| CN | 106024423 A | | 10/2016 | |
| CN | 106497148 A | | 3/2017 | |
| CN | 106925229 A | | 7/2017 | |
| CN | 107282030 A | | 10/2017 | |
| WO | WO 2017/071580 | * | 5/2017 | ............... B01J 21/18 |

OTHER PUBLICATIONS

Huan Wang et al., "Facile preparation of well-combined lignin-based carbon /ZnO hybrid composite with excellent photocatalytic activity." Applied Surface Science 426, pp. 206-216. (Year: 2017).*
Binpeng Zhang et al., "Engineering a lignin-based hollow carbon with opening structure for highly improving the photocatalytic activity and recyclability of ZnO." Industrial Crops & Products 155, pp. 1-10. (Year: 2020).*
Binpeng Zhang et al., "Fabricating ZnO/lignin-derived flower-like carbon composite with excellent photocatalytic activity and recyclability." Carbon 162, pp. 256-266. (Year: 2020).*
Liu et al., "Preparation of Calendula-like Nano-ZnO Induced by Nano-lignin and Its Photocatalytic Performance", Journal of Functional Materials, 2013, pp. 3452-3453, vol. 44:23, ISSN: 1001-9731.
Weng et al., "Toward enhanced photoactivity and photostability of ZnO nanospheres via intimate surface coating with reduced graphene oxide", J. Mater. Chem., 2014, pp. 9380-9389.

* cited by examiner

THREE-DIMENSIONAL LIGNIN POROUS CARBON/ZINC OXIDE COMPOSITE MATERIAL AND ITS PREPARATION AND APPLICATION IN THE FIELD OF PHOTOCATALYSIS

CROSS-REFERENCE TO RELATED APPLICATIONS

This application is the United States national phase of International Application No. PCT/CN2017/111338 filed Nov. 16, 2017, and claims priority to Chinese Patent Application No. 201710328651.7 filed May 11, 2017, the disclosures of each of which are hereby incorporated by reference in their entireties.

BACKGROUND OF THE INVENTION

Field of the Invention

The present invention belongs to the technical field of organic/inorganic hybrid materials, in particular to a three-dimensional lignin porous carbon/zinc oxide composite material and its preparation and application in the field of photocatalysis.

DESCRIPTION OF RELATED ART

In view of the current shortage of resources and energy as well as environmental pollution, it is of great significance to rationally develop renewable resources and synthesize some high value-added functional environmentally friendly materials. On the other hand, China is a large textile country with a huge printing and dyeing industry system, having an annual output of at least 150 million tons of textile printing and dyeing wastewater. The textile printing and dyeing wastewater contains a large amount of organic pollutants, which are complex and difficult to degrade in the natural environment and are thus one of the industrial wastewaters difficult to handle. At present, the use of semiconductor as a catalyst to degrade organic pollutants by photocatalytic oxidation has become a hot spot in the scientific research of environmental protection. Nano-zinc oxide has a wide band gap, large exciton binding energy, low toxicity, stable chemical and optical properties, high photocatalytic efficiency, and other excellent characteristics. Its application has involved optoelectronic devices, gas sensors, sunscreens, antibacterial materials, photocatalysis, etc., so it has great potential in many fields, especially in the field of photocatalysis.

However, in the process of using zinc oxide as a photocatalyst to degrade organic matter, zinc oxide has a very low photocatalytic activity due to factors such as recombination of carriers, which significantly reduces the rate and efficiency of degradation. Numerous studies have shown that the efficiency and rate of photocatalytic degradation of zinc oxide can be effectively improved by loading an appropriate amount of graphene. Weng B et al. [Weng B, Yang M Q, Zhang N, Xu Y J, Toward the enhanced photoactivity and photostability of ZnO nanospheres via intimate surface coating with reduced graphene oxide [J]. J. Mater. Chem. A 2 (2014) 9380-9389] reported a uniform graphene/zinc oxide composite material prepared by loading zinc oxide onto a single layer of graphene, whose application to photocatalytic degradation of rhodamine B pollutants showed excellent results.

As the second largest component in plants, lignin is a polymer with a three-dimensional network structure rich in aromatic rings, and its carbon content is as high as 50% or more. In recent years, studies on the modification of zinc oxide nanoparticles by using lignin and its derivatives as templates have been reported. For example, Chinese patent CN 103183372 A disclosed "A Template Method for Solid-Phase Preparation of Nano Zinc Oxide" on Jul. 23, 2013, which is specifically as follows: first ligninamine was prepared by the Mannich reaction using alkali lignin, and then the obtained ligninamine was used as a template to be physically pulverized with solid sodium carbonate and zinc salt, and placed in a muffle furnace to get calcined in an air atmosphere, so as to remove ligninamine and obtain solid zinc oxide nanoparticles, with the photocatalytic properties of the prepared zinc oxide nanoparticles improved. The ligninamine in this invention acted only as a template, the lignin component in the final product was calcined and pyrolyzed at a high temperature, and the carbon element as the main component in lignin was not fully utilized.

At present, the graphene/zinc oxide composite material has the following shortcomings: In the preparation process, expensive graphene or graphene oxide is used as the raw materials, and it is necessary to use strong acid or strong alkali to effectively disperse graphene or graphene oxide, making the cost of the raw materials too high and limiting the commercial application prospects of the graphene/zinc oxide composite material. Industrial lignin is mainly derived from the paper pulping and biorefinery industries. It is produced in China about 20 million tons per year. The high-value utilization of industrial lignin is of great significance for resources and environment. An earlier Chinese invention patent application CN106024423A of the applicant of the present invention disclosed "A Lignin-Based Graphene/Zinc Oxide Hybrid Composite Material and Its Preparation Method and Application", in which first lignin was subjected to carboxylation graft modification to improve the dispersibility of lignin in aqueous solution, then the modified lignin was compounded with zinc oxalate, and then the product was carbonized to produce a lignin-based graphene/zinc oxide composite material having a sheet graphene structure with a nanometer thickness. However, carbon composites in the field of photocatalysis require a large number of regular tunnel structures that are beneficial for the adsorption of dye organic pollutants, while the sheet graphene structure lacks the large number of regular tunnel structures, which is not conducive to its application in the field of photocatalysis. Therefore, the present invention directly utilizes a high carbon content and a three-dimensional network structure of lignin to prepare a three-dimensional lignin porous carbon/zinc oxide composite material, which is used as a photocatalyst to degrade organic dye pollutants, and can fully utilize a developed interstitial structure in the three-dimensional lignin porous carbon structure to adsorb organic dye pollutants, significantly improving the degradation efficiency and rate of zinc oxide, and having potential application value in the field of photocatalytic degradation of organic pollutants.

SUMMARY OF THE INVENTION

In order to overcome the shortcomings and disadvantages of the above-mentioned prior art that zinc oxide has reduced photocatalytic activity during photocatalysis due to carrier recombination and other factors, a primary object of the present invention is to provide a three-dimensional lignin porous carbon/zinc oxide composite material.

Another object of the present invention is to provide a method for preparing the above three-dimensional lignin porous carbon/zinc oxide composite material. The method of the present invention adopts industrial lignin as a dispersant and a carbon source, and prepares a three-dimensional lignin porous carbon/zinc oxide composite material with a uniform structure by a two-step method through calcination under high temperature conditions, which is easy to obtain the raw materials, low in cost, and favorable for industrial production.

Still another object of the present invention is to provide the application of the above three-dimensional lignin porous carbon/zinc oxide composite material in the field of photocatalysis.

The objects of the present invention are achieved through the following technical solution:

A method for preparing a three-dimensional lignin porous carbon/zinc oxide composite material is a two-step method. The first step is to prepare a lignin/zinc oxide precursor composite by a hydrothermal method from a zinc salt, a weak alkali salt and an industrial lignin. The second step is to prepare a three-dimensional lignin porous carbon/zinc oxide composite material by high temperature calcination of the lignin/zinc oxide precursor composite.

The method comprises the following specific steps:

(1) Adding a weak alkali salt solution to a zinc salt solution to produce a zinc oxide precursor solution;

(2) adding industrial lignin to the zinc oxide precursor solution, stirring uniformly, and keeping the temperature at 70° C. to 150° C. for 1-8 h to produce a lignin/zinc oxide precursor composite; and (3) separating and drying the lignin/zinc oxide precursor composite obtained in Step (2), grinding it into powder, and calcining at 500° C. to 750° C. for 1.5-3 h in an inert gas atmosphere to produce a three-dimensional lignin porous carbon/zinc oxide composite material.

The amount of each reactant is as follows in parts by weight:

parts of industrial lignin; 5-30 parts of zinc salt; and 5-30 parts of weak alkali salt.

The industrial lignin is at least one of the group consisting of wood pulp alkali lignin, bamboo pulp alkali lignin, wheat straw pulp alkali lignin, reed pulp alkali lignin, bagasse pulp alkali lignin, Chinese alpine rush pulp alkali lignin and biorefinery enzymatic lignin.

The zinc salt is at least one of zinc oxalate, zinc acetate, zinc nitrate, zinc chloride, zinc carbonate and zinc sulfate, preferably at least one of zinc oxalate, zinc nitrate and zinc acetate, and more preferably zinc nitrate.

The weak alkali salt is at least one of sodium oxalate, sodium carbonate and sodium bicarbonate, and preferably sodium bicarbonate.

The mass concentration of the zinc salt solution in Step (1) is preferably from 20% to 40%.

The mass concentration of the weak alkali salt solution in Step (1) is preferably from 20% to 40%.

After adding the industrial lignin to the zinc oxide precursor solution as described in Step (2), the solution is preferably stirred for 10-30 min to become uniform.

The keeping the temperature as described in Step (2) is preferably achieved by placing the system in a hydrothermal reactor.

Preferably, the separating and drying as described in Step (3) is carried out by suction filtration of the lignin/zinc oxide precursor composite, and then drying the filter cake; more preferably, the filter cake is dried at 40° C. to 60° C. for 3-6 h.

The present invention also provides a three-dimensional lignin porous carbon/zinc oxide composite material prepared by the above method. The composite material has a regular three-dimensional pore structure, with zinc oxide nanoparticles uniformly embedded among the three-dimensional lignin porous carbon. Application of the composite material to the field of photocatalysis, especially as a photocatalyst for photocatalytic degradation of organic dye pollutants, can significantly improve the degradation efficiency and rate, having potential application value in the field of photocatalytic degradation of organic pollutants. The method of the present invention uses the cheap industrial lignin as the raw material to achieve high value utilization of the industrial lignin, having the advantages of simple and easy process, low cost, and suitability for industrial production.

Compared with the prior art, the present invention has the following advantages and beneficial effects:

The method of the present invention adopts industrial lignin as a dispersant and a carbon source, and prepares a three-dimensional lignin porous carbon/zinc oxide composite material by a two-step method through calcination under high temperature conditions; the oxygen-containing group of the industrial lignin is removed during the calcination process, and the zinc salt is decomposed into zinc oxide, leaving voids, thus producing a three-dimensional lignin porous carbon/zinc oxide composite material. The method of the present invention has the advantages of simple process, easy control, easy availability of raw materials and low production cost, and the obtained three-dimensional lignin porous carbon/zinc oxide composite material has good photocatalytic effect and is suitable for industrial production.

DETAILED DESCRIPTION OF THE EMBODIMENTS

The present invention will be further described in detail with reference to examples, but the embodiments of the present invention are not limited thereto.

The materials used in the following examples are commercially available.

Example 1

5 g of zinc nitrate and 5 g of sodium bicarbonate were respectively dissolved in water to prepare a solution having a mass concentration of 20%, and then the sodium bicarbonate solution was added to the zinc nitrate solution, followed by stirring at room temperature. Then 10 g of wood pulp alkali lignin solid powder was added, and the resulted solution was stirred for 10 min and transferred to a hydrothermal reactor and kept at 70° C. for 8 h to produce a lignin/zinc oxide precursor composite, which was subjected to suction filtration to produce a filter cake. The filter cake was dried in a low temperature oven at a drying temperature of 40° C. for a drying time of 3 h. The obtained solid was ground into a powder, and calcined at 500° C. under the protection of $N_2$ for 3 h, and then cooled to room temperature to produce a three-dimensional lignin porous carbon/zinc oxide composite material.

Example 2

30 g of zinc chloride and 30 g of sodium carbonate were respectively dissolved in water to prepare a solution having a mass concentration of 40%, and then the sodium carbonate solution was added to the zinc chloride solution, followed by stirring at room temperature. Then 10 g of bamboo pulp alkali lignin solid powder was added, and the resulted solution was stirred for 30 min and transferred to a hydrothermal reactor and kept at 90° C. for 8 h to produce a lignin/zinc oxide precursor composite, which was subjected to suction filtration to produce a filter cake. The filter cake was dried in a low temperature oven at a drying temperature of 60° C. for a drying time of 4 h. The obtained solid was ground into a powder, and calcined at 750° C. under the protection of $N_2$ for 1.5 h, and then cooled to room temperature to produce a three-dimensional lignin porous carbon/zinc oxide composite material.

Example 3

15 g of zinc oxalate and 15 g of sodium bicarbonate were respectively dissolved in water to prepare a solution having a mass concentration of 30%, and then the sodium bicarbonate solution was added to the zinc oxalate solution, followed by stirring at room temperature. Then 10 g of wheat straw pulp alkali lignin solid powder was added, and the resulted solution was stirred for 20 min and transferred to a hydrothermal reactor and kept at 120° C. for 2 h to produce a lignin/zinc oxide precursor composite, which was subjected to suction filtration to produce a filter cake. The filter cake was dried in a low temperature oven at a drying temperature of 40° C. for a drying time of 5 h. The obtained solid was ground into a powder, and calcined at 650° C. under the protection of $N_2$ for 2 h, and then cooled to room temperature to produce a three-dimensional lignin porous carbon/zinc oxide composite material.

Example 4

10 g of zinc carbonate and 10 g of sodium oxalate were respectively dissolved in water to prepare a solution having a mass concentration of 30%, and then the sodium oxalate solution was added to the zinc carbonate solution, followed by stirring at room temperature. Then 10 g of reed pulp alkali lignin solid powder was added, and the resulted solution was stirred for 20 min and transferred to a hydrothermal reactor and kept at 130° C. for 5 h to produce a lignin/zinc oxide precursor composite, which was subjected to suction filtration to produce a filter cake. The filter cake was dried in a low temperature oven at a drying temperature of 50° C. for a drying time of 3 h. The obtained solid was ground into a powder, and calcined at 750° C. under the protection of $N_2$ for 2 h, and then cooled to room temperature to produce a three-dimensional lignin porous carbon/zinc oxide composite material.

Example 5

20 g of zinc nitrate and 20 g of sodium bicarbonate were respectively dissolved in water to prepare a solution having a concentration of 25%, and then the sodium bicarbonate solution was added to the zinc nitrate solution, followed by stirring at room temperature. Then 10 g of enzymatic lignin solid powder was added, and the resulted solution was stirred for 20 min and transferred to a hydrothermal reactor and kept at 150° C. for 3 h, and then cooled to room temperature to produce a lignin/zinc oxide precursor composite, which was subjected to suction filtration to produce a filter cake. The filter cake was dried in a low temperature oven at a drying temperature of 50° C. for a drying time of 4 h. The obtained solid was ground into a powder, and calcined at 750° C. under the protection of $N_2$ for 1.5 h, and then cooled to room temperature to produce a three-dimensional lignin porous carbon/zinc oxide composite material.

Description of Example Effects

The crystal structure of the prepared three-dimensional lignin porous carbon/zinc oxide composite material was measured by a Brooke D8 Advance X-ray powder diffractometer according to the method described in the specification thereof; the carbonization effect of the lignin in the prepared three-dimensional lignin porous carbon/zinc oxide composite material was measured by a LabRAMAramis micro-Raman spectrometer according to the method described in the specification thereof; the microstructure of the prepared three-dimensional lignin porous carbon/zinc oxide composite material was characterized by a scanning electron microscope (SEM, Merlin, Zeiss) and a transmission electron microscope (TEM, JEM-2100F, JEOL); and the carbonization effect was characterized by a Raman spectrometer (LabRAMAramis, France).

Figure 1:
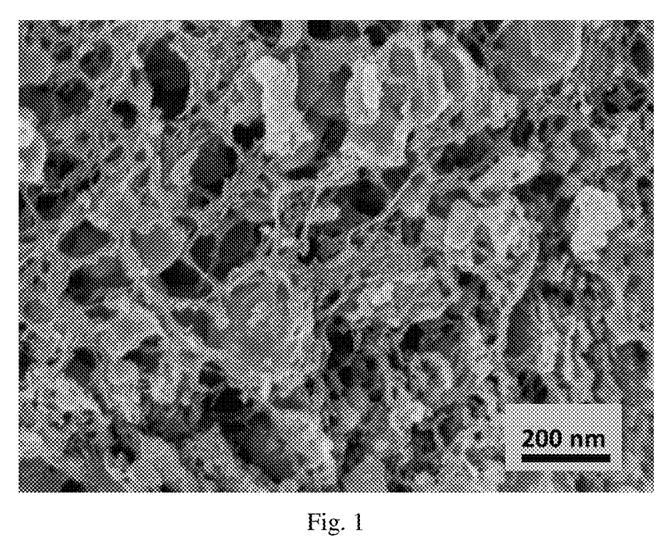
FIG. 1 is a scanning electron micrograph of the three-dimensional lignin porous carbon/zinc oxide composite material prepared in Example 2.
Figure 2:
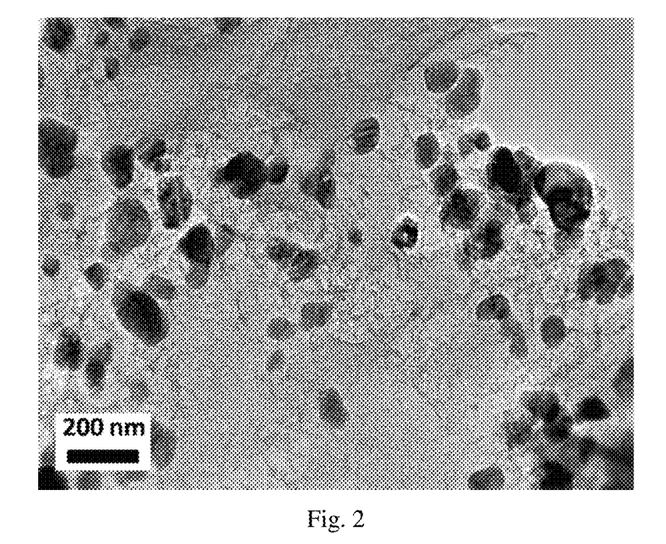
FIG. 2 is a transmission electron micrograph of the three-dimensional lignin porous carbon/zinc oxide composite material prepared in Example 2.

It can be seen from the scanning electron micrograph of FIG. 1 that the zinc oxide nanoparticles and the three-dimensional lignin porous carbon obtained by high-temperature carbonization were very closely combined to form a three-dimensional lignin porous carbon/zinc oxide nanocomposite structure. It is apparent from FIG. 2 that the zinc oxide nanoparticles were combined with the three-dimensional lignin porous carbon.

Figure 3:
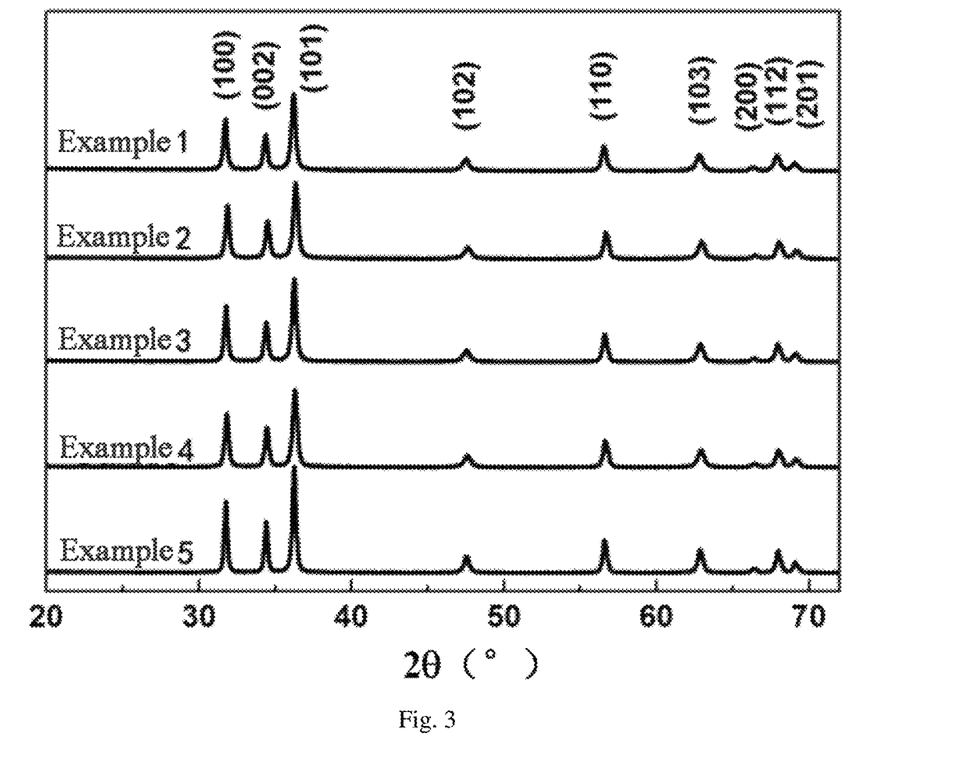
FIG. 3 is an X-ray diffraction pattern of the three-dimensional lignin porous carbon/zinc oxide composite material prepared in Examples 1-5.

FIG. 3 shows an XRD pattern of the three-dimensional lignin porous carbon/zinc oxide composite material prepared in Examples 1-5. It can be seen from the figure that zinc oxide in the prepared composite material had a typical hexagonal wurtzite structure, which indicates that the addition of the industrial lignin did not alter the nanostructured crystal form of zinc oxide during the preparation of the hybrid structure.

Figure 4:
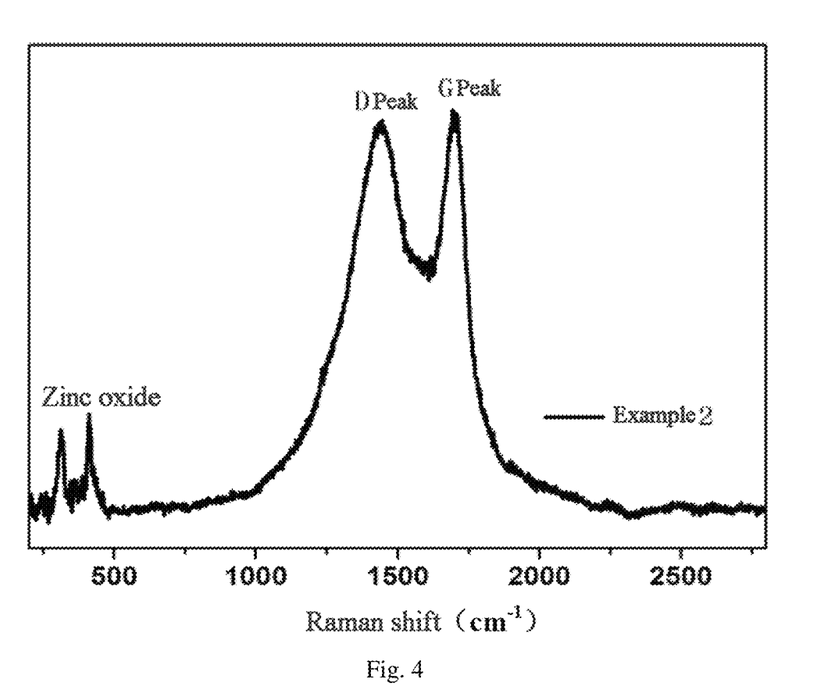
FIG. 4 is a Raman spectrum of the three-dimensional lignin porous carbon/zinc oxide composite material prepared in Example 4.

FIG. 4 shows a Raman spectrum of the three-dimensional lignin porous carbon/zinc oxide composite material prepared in Example 4. The characteristic peaks of zinc oxide at 200-400 $cm^{-1}$ and the characteristic peaks D and G of the carbon material can be seen from FIG. 4, which indicates that the three-dimensional lignin porous carbon/zinc oxide composite material had been successfully obtained.

Figure 5:
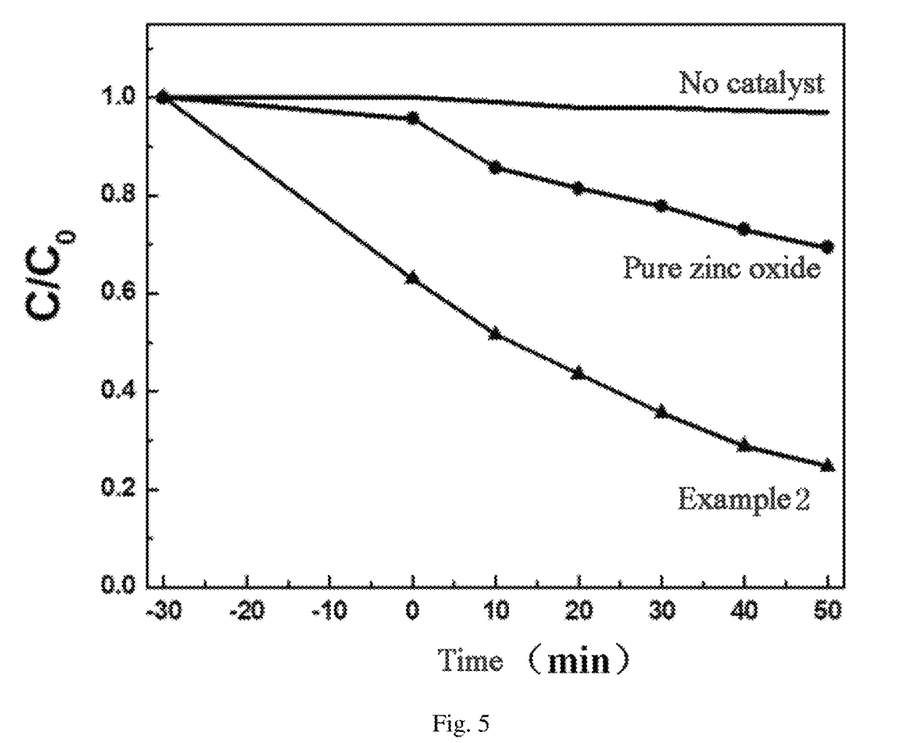
FIG. 5 shows the experimental results of the concentration change of rhodamine B photocatalyzed to degrade by the three-dimensional lignin porous carbon/zinc oxide composite material prepared in Example 2.

FIG. 5 shows the experimental results of the concentration change of rhodamine B photocatalyzed to degrade by the three-dimensional lignin porous carbon/zinc oxide composite material prepared in Example 2.

Figure 6:
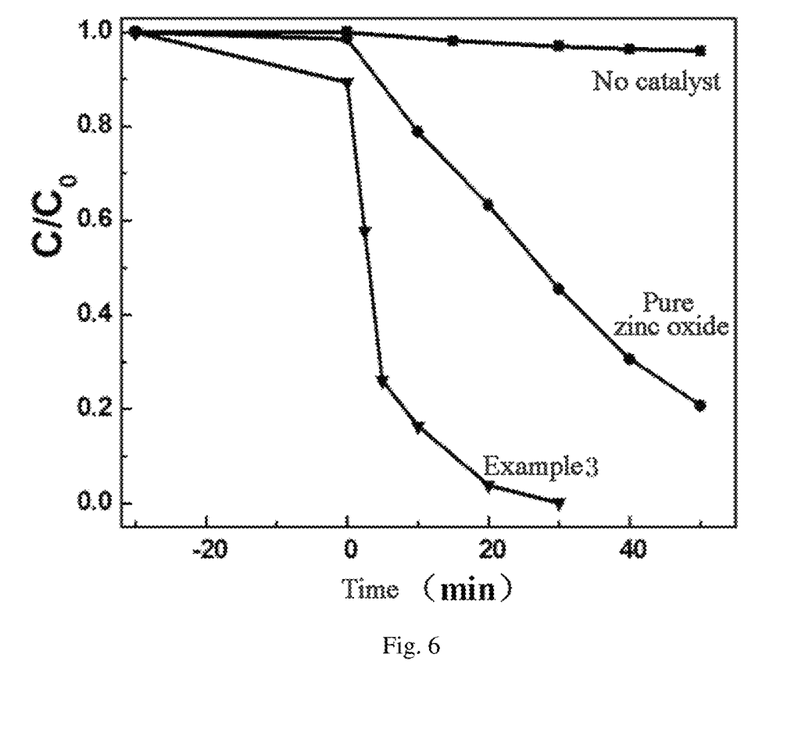
FIG. 6 shows the experimental results of the concentration change of methyl orange photocatalyzed to degrade by the three-dimensional lignin porous carbon/zinc oxide composite material prepared in Example 3.

FIG. 6 shows the experimental results of the concentration change of methyl orange photocatalyzed to degrade by the three-dimensional lignin porous carbon/zinc oxide composite material prepared in Example 3.

60 mg of the three-dimensional lignin porous carbon/zinc oxide composite material prepared in Example 2 were weighed for each of six groups, respectively, and 60 mg of pure zinc oxide were weighed for each of six groups, respectively. These groups of the three-dimensional lignin porous carbon/zinc oxide composite material and pure zinc oxide were respectively added to 100 mL of a rhodamine B solution having a mass concentration of 15 mg/L, and irradiated by simulated sunlight (a 500 W xenon lamp). A group of solutions was taken at intervals for determination of the concentration thereof, and a group of blank contrast experiment without any catalyst was provided. The experimental results show that the obtained three-dimensional lignin porous carbon/zinc oxide composite material had the excellent property of photocatalytic degradation of rhodamine B, and its photocatalytic degradation rate was about 2.7 times higher than that of the pure zinc oxide.

60 mg of the three-dimensional lignin porous carbon/zinc oxide composite material prepared in Example 3 were weighed for each of six groups, respectively, and 60 mg of pure zinc oxide were weighed for each of six groups, respectively. These groups of the three-dimensional lignin porous carbon/zinc oxide composite material and pure zinc oxide were respectively added to 100 mL of a methyl orange solution having a mass concentration of 15 mg/L, and irradiated by simulated sunlight (a 500 W xenon lamp). A group of solutions was taken at intervals for determination of the concentration thereof, and a group of blank contrast experiment without any catalyst was provided. The experimental results show that the obtained three-dimensional lignin porous carbon/zinc oxide composite material had the excellent property of photocatalytic degradation of methyl orange, and its photocatalytic degradation rate was about 5.1 times higher than that of the pure zinc oxide.

The above examples are preferred embodiments of the present invention, but the embodiments of the present invention are not limited thereto, and any other alterations, modifications, substitutions, combinations and simplifications made without departing from the spirit and principle of the present invention should all be equivalent replacements and included in the scope of protection of the present invention.

The invention claimed is:

1. A method for preparing a three-dimensional lignin porous carbon/zinc oxide composite material, comprising (1) preparing a lignin/zinc oxide precursor composite by a hydrothermal method from a zinc salt, a weak alkali salt and an industrial lignin, and (2) preparing a three-dimensional lignin porous carbon/zinc oxide composite material by high temperature calcination of the lignin/zinc oxide precursor composite;

wherein step (1) comprises:

(1.1) adding a weak alkali salt solution to a zinc salt solution to produce a zinc oxide precursor solution;

(1.2) adding industrial lignin to the zinc oxide precursor solution, stirring uniformly, and keeping the temperature at 70° C. to 150° C. for 1-8 hours to produce a lignin/zinc oxide precursor composite.

2. The method for preparing the three-dimensional lignin porous carbon/zinc oxide composite material according to claim 1, wherein the amount of each reactant in step (1) is as follows in parts by weight:

10 parts of industrial lignin; 5-30 parts of zinc salt; and 5-30 parts of weak alkali salt.

3. The method for preparing the three-dimensional lignin porous carbon/zinc oxide composite material according to claim 2, wherein the mass concentration of the zinc salt solution is from 20% to 40%; and the mass concentration of the weak alkali salt solution is from 20% to 40%.

4. The method for preparing the three-dimensional lignin porous carbon/zinc oxide composite material according to claim 2, wherein after adding the industrial lignin to the zinc oxide precursor solution, the solution is stirred for 10-30 min to become uniform; and keeping the temperature is achieved by placing the system in a hydrothermal reactor.

5. The method for preparing the three-dimensional lignin porous carbon/zinc oxide composite material according to claim 1, wherein the industrial lignin is at least one of wood pulp alkali lignin, bamboo pulp alkali lignin, wheat straw pulp alkali lignin, reed pulp alkali lignin, bagasse pulp alkali lignin, Chinese alpine rush pulp alkali lignin or biorefinery enzymatic lignin;

the zinc salt is at least one of zinc oxalate, zinc acetate, zinc nitrate, zinc chloride, zinc carbonate or zinc sulfate; and the weak alkali salt is at least one of sodium oxalate, sodium carbonate or sodium bicarbonate.

6. The method for preparing the three-dimensional lignin porous carbon/zinc oxide composite material according to claim 1, wherein the zinc salt is at least one of zinc oxalate, zinc nitrate or zinc acetate; and the weak alkali salt is sodium bicarbonate.

7. A three-dimensional lignin porous carbon/zinc oxide composite material, obtained by the preparation method according to claim 1.

8. A photocatalyst comprising the three-dimensional lignin porous carbon/zinc oxide composite material according to claim 7.

9. A method for photocatalytic degradation of organic dye pollutants, comprising treating the organic dye pollutants with the photocatalyst according to claim 8.

10. The method for preparing the three-dimensional lignin porous carbon/zinc oxide composite material according to claim 1, wherein step (2) comprises: separating and drying the lignin/zinc oxide precursor composite, grinding it into powder, and calcining at 500° C. to 750° C. for 1.5-3 h in an inert gas atmosphere to produce a three-dimensional lignin porous carbon/zinc oxide composite material.

11. The method for preparing the three-dimensional lignin porous carbon/zinc oxide composite material according to claim 10, wherein the separating and drying is carried out by suction filtration of the lignin/zinc oxide precursor composite, and then drying the filter cake.

* * * * *